United States Patent
Homma et al.

(10) Patent No.: US 11,014,122 B2
(45) Date of Patent: May 25, 2021

(54) METHOD FOR FORMING MULTILAYER COATING FILM

(71) Applicants: BASF Coatings GmbH, Münster (DE); Honda Motor Co. Ltd., Tokyo (JP)

(72) Inventors: Kyohei Homma, Yokohama (JP); Hisayuki Nakashima, Yokohama (JP); Yusuke Yagi, Yokohama (JP); Yusuke Kurata, Tokyo (JP); Takeshi Ogawa, Tokyo (JP)

(73) Assignees: BASF Coatings GmbH, Muenster (DE); Honda Motor Co. Ltd., Tokyo (JP)

(*) Notice: Subject to any disclaimer, the term of this patent is extended or adjusted under 35 U.S.C. 154(b) by 70 days.

(21) Appl. No.: 16/485,900

(22) PCT Filed: Apr. 3, 2018

(86) PCT No.: PCT/EP2018/058414
§ 371 (c)(1),
(2) Date: Aug. 14, 2019

(87) PCT Pub. No.: WO2018/197163
PCT Pub. Date: Nov. 1, 2018

(65) Prior Publication Data
US 2020/0038908 A1 Feb. 6, 2020

(30) Foreign Application Priority Data
Apr. 25, 2017 (JP) .............. JP2017-085883

(51) Int. Cl.
B05D 7/00 (2006.01)
B05D 7/14 (2006.01)
B05D 1/36 (2006.01)
C08G 18/80 (2006.01)
C08K 5/00 (2006.01)
C08K 5/3492 (2006.01)

(52) U.S. Cl.
CPC ............ B05D 7/5723 (2013.01); B05D 1/36 (2013.01); B05D 7/14 (2013.01); C08G 18/80 (2013.01); C08K 5/0025 (2013.01); C08K 5/34922 (2013.01); B05D 2202/00 (2013.01); B05D 2401/20 (2013.01); B05D 2425/03 (2013.01); B05D 2503/00 (2013.01)

(58) Field of Classification Search
CPC ............ B05D 7/5723; B05D 1/36; B05D 7/14
See application file for complete search history.

(56) References Cited

U.S. PATENT DOCUMENTS

| 2009/0117396 | A1 | 5/2009 | Furusawa et al. |
| 2009/0226673 | A1 | 9/2009 | Friedersdorf et al. |
| 2015/0004401 | A1 | 1/2015 | Kojima et al. |
| 2015/0079293 | A1* | 3/2015 | Togai ............... C08G 18/12 427/379 |
| 2015/0275036 | A1* | 10/2015 | Ichimura ............ C25D 13/12 205/50 |

FOREIGN PATENT DOCUMENTS

| EP | 2431171 A1 | 3/2012 |
| WO | 2007126107 A1 | 11/2007 |
| WO | 2011010538 A1 | 1/2011 |
| WO | 2013129136 A1 | 9/2013 |
| WO | 2013141305 A1 | 9/2013 |

OTHER PUBLICATIONS

International Search Report for International Application No. PCT/EP2018/058414, dated Jul. 16, 2018, 3 pages.
Written Opinion of the International Searching Authority for International Application No. PCT/EP2018/058414, dated Jul. 16, 2018, 5 pages.

* cited by examiner

Primary Examiner — Dah-Wei D. Yuan
Assistant Examiner — Kristen A Dagenais-Englehart
(74) Attorney, Agent, or Firm — Armstrong Teasdale LLP

(57) ABSTRACT

Disclosed is a method for forming a multilayer coating film, including applying a first and second aqueous base coat, and a clear coat to an object, and thereafter simultaneously heating and curing the three-layer coating film. The first aqueous base coat includes a water-soluble or water-dispersible polyurethane resin having a glass transition temperature of −20° C. or below and a weight average molecular weight of 30,000 to 500,000, and a crosslinkable resin having a weight average molecular weight of 600 or more. The first aqueous base coat-coated film has a breaking strength of 2050 N/cm2 or more and a loss tangent (tan δ) at −20° C. of 0.075 or more. The migration amount of a melamine resin from the second aqueous base coat-coated film layer to the first aqueous base coat-coated film layer is within 3% by mass of a total resin solid content of the first aqueous base coat.

4 Claims, No Drawings

METHOD FOR FORMING MULTILAYER COATING FILM

CROSS-REFERENCE TO RELATED APPLICATIONS

This application is a U.S. National Phase Application of PCT/EP2018/058414, filed Apr. 3, 2018, which claims the benefit of priority to JP Application No. 2017-085883, filed Apr. 25, 2017, the contents of which are hereby expressly incorporated by reference in their entirety.

TECHNICAL FIELD

The present invention relates to a novel method for forming a multilayer coating film which can be used in various fields, in particular in the field of automobile coatings.

BACKGROUND ART

In general, when an automobile body is an object to be coated, methods for forming a multilayer coating film involve forming an electrodeposition coating film on the object to be coated and carrying out curing by heating, and thereafter forming a multilayer coating film comprising a middle coating film, a base coating film and a clear coating film.

In recent years, in order to reduce volatile organic solvents (VOC), aqueous coatings are used as a middle coating and a base coating, and furthermore, a method for forming a multilayer coating film by means of so-called 3 coats 1 bake (3C1B) system is widely spread from the viewpoint of energy saving which involves forming a middle coating film by applying an aqueous middle coating onto an electrodeposition coating film, forming a base coating film by applying an aqueous base coating onto the uncured middle coating film, forming a clear coating film by applying a clear coating onto the uncured base coating film, and simultaneously heating and curing the three-layer coating film.

Moreover, in recent years, a method for forming a multilayer coating film which involves application of a first aqueous coating and a second aqueous coating by means of so-called wet-on-wet method is started to be used in which pre-heating between the middle coating application and the base coating application is eliminated.

However, with the 3C1B application with wet-on-wet system, mixing of phases readily takes place in between the middle coating film and the base coating film, and thus there are problems such as that the resulting coating film suffers from having less smoothness and less haze-free gloss, a decrease in chipping resistance due to a migration of a curing agent between the coating films.

For this reason, Patent Document 1 discloses a method for forming a multilayer coating film which improves smoothness, haze-free gloss and chipping resistance by using a first coating including a specific aqueous polyester resin, a specific aqueous acrylic resin, an aqueous urethane resin and a melamine resin.

In addition, Patent Document 2 discloses a method for forming a multilayer coating film which improves smoothness, haze-free gloss and chipping resistance by using a coating obtained from a first aqueous coating including a polyester having a benzene ring or a cyclohexane ring, and at least one curing agent selected from the group consisting of an isocyanate group-containing compound, an oxazoline group-containing compound, a carbodiimide group-containing compound, a hydrazide group-containing compound, and a semicarbazide group-containing compound, at a specific content.

However, with the method as above which only specifies the starting material resin of the first aqueous coating, there is a concern that sufficient smoothness, haze-free gloss and chipping resistance may not be exhibited depending on the design of a second aqueous coating, and thus the range of the second coating to be used is limited.

With this matter, Patent Document 3 indicates that, for a multilayer coating film in which the dry film thickness of a first base coating monofilm is 25 µm, the dry film thickness of a second base coating monofilm is 10 µm and the dry film thickness of a clear coating monofilm is 30 µm, the tensile strength and elongation percentage at 20° C. are set to a range from 400 to 600 kgf/m$^2$ and 40 to 60%, respectively, and a ratio (tan δ) of a viscous term with respect to an elastic term at −20° C. is set to a range from 0.04 to 0.06, accordingly, excellent chipping resistance is exhibited while maintaining the smoothness of a multilayer coating film.

However, this multilayer coating film formation method secures the chipping resistance merely by selecting an optimal first aqueous coating in accordance with various designs of a second aqueous coating, and thus it is difficult to select various second coatings for a single first coating.

PRIOR ART DOCUMENTS

Patent Documents

[Patent Document 1] WO2013/129136
[Patent Document 2] WO2007/126107
[Patent Document 3] WO2013/141305

SUMMARY OF THE INVENTION

Problems to be Solved by the Invention

Accordingly, the invention is to provide a method for forming a multilayer coating film by means of 3C1B of wet-on-wet system, which provides a multilayer coating film with excellent chipping resistance while maintaining smoothness even for a wide range of second aqueous coatings (second aqueous base coats).

Means for Solving the Problems

The present inventors carried out intensive studies in order to solve the abovementioned problems, and as a result, they have found that the abovementioned problems can be solved when a coating film has properties that are within the specific value ranges, wherein the coating film uses a first aqueous base coat including a water-soluble or water-dispersible polyurethane resin having specific glass transition temperature and weight average molecular weight and a crosslinkable resin having a specific weight average molecular weight, and also when the migration amount of a melamine resin from the second aqueous base coat-coated film layer to the first aqueous base coat-coated film layer is 3 parts by mass or less with respect to 100 parts by mass of the total resin component of the first aqueous base coat, and accordingly, they have completed the invention.

That is, the invention relates to a method for forming a multilayer coating film, comprising applying a first aqueous base coat, a second aqueous base coat and a clear coat to an object to be coated in succession and simultaneously heating and curing the three-layer coating film, wherein the first aqueous base coat includes a polyurethane resin having a glass transition temperature of −20° C. or below and a weight average molecular weight of 30,000 to 500,000, and a crosslinkable resin having a weight average molecular weight of 600 or more, the first aqueous base coat-coated film (a monolayer coated film obtained by applying a first aqueous base coat and heating and curing the same without applying any further coatings such as a second aqueous base coat) has a breaking strength of 2050 N/cm$^2$ or more and a loss tangent (tan δ) at −20° C. of 0.075 or more, and the migration amount of a melamine resin from the second aqueous base coat-coated film layer to the first aqueous base coat-coated film layer is within 3 parts by mass with respect to 100 parts by mass of a total resin solid content of the first aqueous base coat.

In addition, the invention relates to the method for forming a multilayer coating film, wherein the first aqueous base coat includes 20 to 40 parts by mass of the water-soluble or water-dispersible polyurethane resin with respect to 100 parts by mass of the total resin solid content.

In addition, the invention relates to the method for forming a multilayer coating film, wherein the crosslinkable resin of the first aqueous base coat is a melamine resin and/or blocked polyisocyanate resin and the crosslinkable resin is included in an amount of 25 to 35 parts by mass with respect to 100 parts by mass of the total resin solid content.

In addition, the invention relates to the method for forming a multilayer coating film, wherein the second aqueous base coat includes a crosslinkable resin in an amount of 10 to 40 parts by mass with respect to 100 parts by mass of the total resin solid content.

Effects of the Invention

According to the method for forming a multilayer coated film of the invention, it is possible to obtain a multilayer coated film having excellent chipping resistance while maintaining smoothness even with various types of second aqueous base coats by means of 3C1B of wet-on-wet system.

MODE FOR CARRYING OUT THE INVENTION

Hereinafter, the invention will be specifically described, but the invention is not limited by these.

First Base Coat (A)

The first aqueous base coat (A) of the invention includes a water-soluble or water-dispersible polyurethane resin (A1) as a base resin, and a crosslinkable resin (A2) as a crosslinking agent. Herein, the 'base resin' in the present specification refers to a resin having a functional group which reacts with a crosslinking agent.

The water-soluble or water-dispersible polyurethane resin (A1) is not particularly limited, and may be obtained by a well-known method using a polyol, a polyisocyanate compound, a dimethylol alkanoic acid, a polyhydric alcohol or the like as a starting material component.

As the polyol, for example, at least one selected from among polyester polyols, polyether polyols, polycarbonate polyols and the like may be used, and among these, it is preferably selected from among polyester polyols and polycarbonate polyols.

The polyester polyols may be obtained by a well-known method involving an esterification reaction which uses polybasic acids and polyhydric alcohols as starting material components.

The polycarbonate polyols may be obtained by a well-known method involving a polycondensation reaction of a polyol and a carbonylation agent.

Examples of the polyisocyanate compound include aromatic diisocyanates such as 4,4'-diphenylmethanediisocyanate, 2,4- or 2,6-tolylenediisocyanate, 1,5-naphthalenediisocyanate and p- or m-phenylenediisocyanate; alicyclic diisocyanates such as hydrogen-added product of tolylene diisocyanate, isophorone diisocyanate, 4,4'-dicyclohexylmethane diisocyanate and 1,4-cyclohexylene diisocyanate; aliphatic diisocyanates such as hexamethylene diisocyanate; xylene diisocyanate; m-tetramethylxylene diisocyanate; and the like. These polyisocyanate compounds may be used alone or in combination of two or more kinds.

Examples of the dimethylol alkanoic acid include dimethylol propionic acid, dimethylol butanoic acid, dimethylol pentanoic acid, dimethylol heptanoic acid, dimethylol octanoic acid and dimethylol nonanoic acid. These dimethylol alkanoic acids may be used alone or in combination of two or more kinds.

As the polyhydric alcohol, glycol and polyhydric alcohols of three or more valencies may be used. Examples of the glycol include ethylene glycol, propylene glycol, diethylene glycol, trimethylene glycol, tetraethylene glycol, dipropylene glycol, polyethylene glycol, polypropylene glycol, neopentyl glycol, hexylene glycol, 1,3-butanediol, 1,4-butanediol, 1,5-pentanediol, 1,6-hexanediol, 2-butyl-2-ethyl-1,3-propanediol, methylpropanediol, cyclohexane dimethanol, 3,3-diethyl-1,5-pentanediol and the like. Examples of the polyhydric alcohol of three or more valencies include glycerin, trimethylolethane, trimethylolpropane, pentaerythritol, dipentaerythritol and the like. These polyhydric alcohols may be used alone or in combination of two or more kinds.

The weight average molecular weight of the water-soluble or water-dispersible polyurethane resin (A1) is from 30,000 to 500,000, and is preferably from 60,000 to 140,000 from the viewpoint of coating workability. At a weight average molecular weight of less than 30,000, the gloss of the multilayer coating film may reduce due to a layer mixing, and at a weight average molecular weight of greater than 500,000, the multilayer coating film may have rough surface due to a decrease in flowability. The value of the weight average molecular weight described in the specification is obtained by means of gel permeation chromatography (GPC) by using polystyrene as a reference material.

The glass transition temperature of the water-soluble or water-dispersible polyurethane resin (A1) is preferably −20° C. or below from the viewpoint of chipping resistance, and is more preferably between −50° C. and −110° C. from the viewpoints of chipping resistance and coating film hardness. When the glass transition temperature is higher than −20° C., the chipping resistance may reduce. The value of the glass transition temperature described in the specification is a value of a transition initiation temperature according to a differential scanning calorimetry (DSC) measurement.

The hydroxyl group value of the water-soluble or water-dispersible polyurethane resin (A1) is not particularly limited, but is preferably, for example, from 20 to 120 mgKOH/g.

According to the invention, the water-soluble or water-dispersible polyurethane resin (A1) is included in an amount of preferably from 20 to 40 parts by mass, more preferably from 20 to 30 parts by mass, with respect to 100 parts by mass of the total amount of the resin solid content in the first aqueous base coat (A).

As the crosslinkable resin (A2), for example, one or two or more selected from among amino resins and blocked polyisocyanate resins may be used in combination.

The amino resin is an inclusive term for resins obtained by adding formaldehyde to a compound having an amino group and allowing condensation to take place. Specific examples include a melamine resin, a urea resin, a guanamine resin, and the like, and a preferred one is a melamine resin.

Examples of the melamine resin include partially or fully methylolated melamine resins obtained by reacting melamine with formaldehyde, partial or full alkyl ether-type melamine resins obtained by partially or fully etherifying a methylol group of a methylolated melamine resin with an alcohol component, imino group-containing-type melamine resins, and mixed-type melamine resins in which two or more types of these melamine resins are mixed. Examples of the alkyl ether-type melamine resins include methylated melamine resins, butylated melamine resins, methyl/butyl mixed alkyl-type melamine resins, and the like.

The blocked polyisocyanate resin is, for example, obtained by protecting an isocyanate group of aliphatic-based, aromatic-based or alicyclic-based polyisocyanate compounds with a blocking agent, and examples of the blocking agent include alcohols such as butanol, oximes such as methyl ethyl ketoxime, lactams such as ε-caprolactams, ketoesters such as acetoacetic esters, imidazoles such as imidazole and 2-ethylimidazole, phenols such as m-cresol, and the like.

The weight average molecular weight of the crosslinkable resin (A2) is preferably 600 or more, and from the viewpoint of coating workability, is more preferably from 800 to 1200, particularly preferably from 900 to 1100. At a weight average molecular weight is less than 600, chipping resistance of the multilayer coating film may decrease.

The blended amount of the crosslinkable resin (A2) to the first aqueous base coat (A) for the invention is preferably from 25 to 35 parts by mass, more preferably from 28 to 32 parts by mass, with respect to 100 parts by mass of the total amount of the resin solid content in the first aqueous base coat (A). At the crosslinkable resin (A2) amount of less than 25 parts by mass, water resistance may decrease, and at the amount greater than 35 parts by mass, chipping resistance may reduce.

Second Base Coat (B)

Unlike the first aqueous coat (A) for which the base resin is limited to a certain degree, the second aqueous base coat (B) is not particularly limited as long as it includes a base resin and a crosslinkable resin.

The base resin of the second base coat (B) is not particularly limited as long as it is a water-soluble or water-dispersible resin, and may be, for example, at least one water-soluble or water-dispersible resin selected from among an acrylic resin, a polyester resin, a polyurethane resin, and an acrylic-urethane resin, more preferably at least one water-soluble or water-dispersible resin selected from among an acrylic resin, a polyurethane resin, and a polyester resin, and particularly preferably at least one water-soluble or water-dispersible resin selected from among an acrylic resin and polyurethane resin.

The crosslinkable resin of the second aqueous base coat (B) is also not particularly limited, and an amino resin is preferable and a melamine resin is more preferable.

The crosslinkable resin of the second aqueous base coat (B) is included in an amount of preferably 10 to parts by mass, particularly preferably 20 to 30 parts by mass, with respect to 100 parts by mass of the total amount of the resin solid content.

The water-soluble or water-dispersible resin which serves as the base resin of the first aqueous base coat (A) and the second aqueous base coat (B) is preferably used in a state in which at least some of acid groups in the resin are neutralized with a basic substance. In this manner, the resin can be in a stable state in the aqueous coatings.

Examples of the basic substance include ammonia, morpholine, N-alkylmorpholine, monoisopropanolamine, methylethanolamine, methylisopropanolamine, dimethylethanolamine, diisopropanolamine, diethanolamine, triisopropanolamine, diethylethanolamine, triethanolamine, methylamine, ethylamine, propylamine, butylamine, 2-ethylhexylamine, dimethylamine, diethylamine, dipropylamine, dibutylamine, trimethylamine, triethylamine, triisopropylamine, tributylamine and the like. These basic substances may be used alone or in combination of two or more kinds.

The first aqueous base coat (A) and the second aqueous base coat (B) may include various pigments such as colored pigments, luster pigments and extender pigments. Examples of the colored pigments include inorganic-based pigments such as chrome yellow, yellow iron oxide, iron oxide, carbon black and titanium dioxide, and organic-based pigments such as azochelate-based pigments, insoluble azo-based pigments, condensed azo-based pigments, phthalocyanine-based pigments, indigo pigments, perinone-based pigments, perylene-based pigments, dioxane-based pigments, quinacridone-based pigments, isoindolinone-based pigments and metal complex pigments. Examples of the luster pigments include aluminum flake pigments, alumina flake pigments, mica pigments, silica flake pigments, glass flake pigments and the like. Examples of the extender pigments include calcium carbonate, barite, precipitated barium sulfate, clay, talc and the like. These pigments may be used alone or in combination of two or more kinds.

When adding the pigments to the first aqueous base coat (A) and the second aqueous base coat (B), the mass content ratio thereof is, for example, 3 to 200 parts by mass with respect to 100 parts by mass of the total amount of the resin solid content of entire resins (including other resins such as a crosslinkable resin, in addition to the base resin) included in the base coats (A) and (B), and specifically, the ratio is 3, 5, 15, 30, 50, 70, 90, 110, 130, 150, 175, 200 parts by mass, and may also be within the range of any two numerical values mentioned above.

The first aqueous base coat (A) and the second aqueous base coat (B) may include at least one additive such as various additive agents like a surface conditioner, an antifoaming agent, a surfactant, a film forming auxiliary agent, a preservative agent, an ultraviolet absorber, a light stabilizer and an antioxidant, various rheology control agents, and various organic solvents.

The first aqueous base coat (A) and the second aqueous base coat (B) are, as necessary, diluted to an appropriate viscosity by using water or sometimes a small amount of an organic solvent or amine and then used for coating.

Clear Coat (C)

As the clear coat (C) for use in the method for forming a multilayer coating film of the invention, any of an organic solvent coating, an aqueous coating, and a powdery coating may be used. The basic resin of the clear coat is at least one selected from among an acrylic resin, a polyester resin and an alkyd resin, and a curing type includes a melamine curing type, an acid/epoxy curing type, an isocyanate curing type and the like. From the viewpoint of appearance of the coating film, clear coats of acrylic resin/melamine curing type, acrylic resin/isocyanate curing type, acid/epoxy curing type are preferable.

For the method for forming a multilayer coating film of the invention, as a method for applying various coatings, typically used methods in the automobile industry may be used, for example, an air spray coating, an electrostatic air spray coating, an electrostatic rotary bell spray coating, or the like may be used.

For the method for forming a multilayer coating film of the invention, first, the first aqueous base coat (A) is applied to an object to be coated in order to form a first base coat-coated film. After forming the first base coat-coated film, the second base coat (B) is applied to the uncured first base coat-coated film in order to form a second base coat-coated film, the clear coat (C) is applied to the uncured second base coat-coated film in order to form a clear coat-coated film, and simultaneously these three layers of the coating film are heated and cured.

As the object to be coated, there are a metal material with an electrodeposition coating film formed on the surface, a metal material with a middle coating film formed on the electrodeposition coating film, plastics and the like.

For the method for forming a multilayer film of the invention, the coating conditions of the first aqueous base coat (A) and the second aqueous base coat (B) are preferably a temperature of 20 to 30° C., and a relative humidity of 70 to 80%.

For the method for forming a multilayer coating film of the invention, pre-heating may be carried out after application of the first aqueous base coat (A) or after application of the second aqueous base coat (B), but when the first aqueous base coat (A) of the invention is used, a coating film with excellent appearance can still be obtained without performing pre-heating after application of the first aqueous base coat (A) or application of second aqueous base coat (B), in particular, after application of the first aqueous base coat (A). Herein, in the case of carrying out a pre-heating, the temperature is preferably between 30 and 100° C. and the time is preferably between 3 and 10 minutes.

For the method for forming a multilayer coating film of the invention, the heat curing temperature of the multilayer coating film is preferably between 60° C. and 170° C., and the heat curing time is preferably between 20 and 40 minutes.

For the method for forming a multilayer coating film of the invention, from the viewpoints of weather resistance and chipping resistance, the dry film thickness of the first base coat-coated film obtained by applying the first aqueous base coat (A) is preferably from 15 μm to 35 μm, and the dry film thickness of the second base coat-coated film obtained by applying the second aqueous base coat (B) is preferably from 5 μm to 15 μm.

The dry film thickness of the clear coat-coated film obtained by applying the clear coat (C) is not particularly limited, and for example, it is preferably from 25 μm to 60 μm. Herein, the dry film thickness means the thickness of a coated film after heat curing.

For the method for forming a multilayer coating film of the invention, when the dry film thickness of the first base coat-coated film is 15 μm, the dry monolayer coated film of the first base coat-coated film preferably has a breaking strength of 2050 N/cm$^2$ or more and a loss tangent (tan δ) at −20° C. of 0.075 or more. At a breaking strength of less than 2050 N/cm$^2$ or a coated film tan δ at −20° C. of less than 0.075, sufficient chipping resistance may not be achieved.

In order to measure the value of the breaking strength, a monolayer coated film is cut into a size of 10×70 mm, peeled off from the test plate, and used as a test piece for a measurement by means of a tensile testing machine, the monolayer coated film being obtained by applying the first aqueous base coat to a polypropylene-made test plate by means of air spray in the manner such that the dry film thickness is 15 μm, and without applying any further coatings such as the second aqueous base coat, heating only the first base coat-coated film at 140° C. for 30 minutes.

As the tensile testing machine, Tensilon UTM III type (trade name, manufactured by A&D Company, Limited.) is used, and the measurement is carried out at a temperature of 20° C. and a pulling rate of 4 mm/min and with a measurement length of 40 mm. The breaking strength is obtained as a load applied at the time of breaking.

For the value of the loss tangent (tan δ), a monolayer coated film obtained in the same manner as above for the breaking strength is cut into 5×20 mm, and used as a test piece for a measurement by means of a dynamic viscoelasticity measuring device. As the dynamic viscoelasticity measuring device, an automatic dynamic viscoelastometer (manufactured by A&D Company, Limited.) is used, and tan δ at −20° C. is determined from a phase difference generated between the vibration strain and the stress generated at the time of elevating a temperature. Herein, the measurement frequency is 11 Hz, and the temperature increase rate is 2° C./minute.

In addition, for the method for forming a multilayer coating film of the invention, when the dry film thickness of the first base coat-coated film is 15 μm and the dry film thickness of the second base coat-coated film is 12 μm, and when a dry multilayer coating film of the first base coat-coated film and the second base coat-coated film is analyzed, the migration amount of a melamine resin from the second base coat-coated film layer to the first base coat-coated film layer is preferably within 3 parts by mass with respect to 100 parts by mass of the total resin solid content of the first aqueous base coat. At an amount greater than 3 parts by mass, curing of the first aqueous base coat may be inhibited and sufficient chipping resistance may not be achieved. When the second aqueous base coat is free from a melamine resin, there is no risk of inhibiting curing of the first aqueous base coat. In this case, the migration amount of a melamine resin from the second base coat-coated film layer is considered to be 0 part by mass.

For the analysis of the migration amount of the melamine resin, the first base coat-coated film and the second base coat-coated film are formed in the manner such that the dry film thicknesses are 15 μm and 12 μm, respectively, on an electrodeposition plate by means of air spray, and the multilayer coating film without a clear coat is heated at 140° C. for 30 minutes in order to obtain a dry multilayer coating film. The second base coat-coated film is removed by means of sandpaper or the like in order to expose the surface of the first base-coated film, that is, the interface of the first base coat-coated film/second base coat-coated film, and the exposed part is subjected to an infrared microspectroscopic analysis.

As the infrared microspectrometer, Fourier transform infrared spectrometer (manufactured by Thermo Fisher Scientific Inc.) is used, and the measurement is carried out by an ATR technique (material: Si).

First, the first base coat in which a predetermined amount in parts by mass of a melamine resin for the second base coat is mixed is applied and the same is heat cured without applying any further coatings such as the second base coat and the surface of the resulting monolayer coated film is measured. The 1735 cm$^{-1}$ peak strength, P$^o$, which is derived from a carbonyl group in the resin of the first base coat, is used as a standard, and the ratio, P$^1$/P$^o$, of the 1560 cm$^{-1}$ peak strength P$^1$, which is derived from a triazine ring of the melamine resin, is determined, and a calibration curve of the peak strength ratio P$^1$/P$^o$ and the amount in parts by mass of the melamine resin with respect to 100 parts by mass of the total resin solid content of the first base coat is prepared.

Next, the interface of the first base coat-coated film/second base coat-coated film is measured, the 1735 cm$^{-1}$ peak strength, P$^o$, which is derived from a carbonyl group in the resin of the first base coat, is used as a standard, and the ratio, P$^1$/P$^o$, of the 1560 cm$^{-1}$ peak strength P$^1$, which is derived from a triazine ring of the melamine resin, is determined, and according to the calibration curve, the migration amount of the melamine resin is obtained by converting the ratio P$^1$/P$^o$ to the amount in parts by mass of the melamine resin of the second base coat with respect to 100 parts by mass of the total resin solid content of the first base coat. Herein, the peak strength is a height from the base line to the peak top. It is necessary to make the calibration curve for every combination of the first base coat and the second base coat. When the first base coat is free from a melamine resin, in the calibration curve, the peak strength ratio P$^1$/P$^o$ is 0 when the amount in parts by mass of the melamine resin of the second base coat is 0 with respect to 100 parts by mass of the total resin solid content of the first base coat, whereas when the first base coat includes a melamine resin, the peak strength ratio P$^1$/P$^o$ is a value greater than 0 when the amount in parts by mass of the melamine resin of the second base coat is 0 with respect to 100 parts by mass of the total resin solid content of the first base coat.

The abovementioned dry film thicknesses of 15 μm and 12 μm are merely a measurement condition when measuring the migration amount of a melamine resin, and the actual film thicknesses (dry film thickness after heat curing) of the first and second base coat-coated films for forming a multilayer coating film can be set separately from the said dry film thickness for the measurement.

EXAMPLES

Hereinafter, the invention will be described in more detail by way of examples, but the invention is not limited thereto. Herein, unless otherwise particularly stated, 'part', '%', and 'ratio' in examples respectively represent 'parts by mass', 'mass %', and 'mass ratio'.

Production Example 1-1: Production of Water-Dispersible Polyurethane Resin PU-1 for First Aqueous Base Coat Production Example 1-1(a): Production of Polyester Polyol PP-1

Into a flask equipped with a reflux condenser fitted with a separation tube for a reaction water, a thermometer, a stirrer, and a nitrogen gas introduction tube, 35.0 parts of dimer acid (trade name 'PRIPOL 1017', manufactured by Croda International plc, number of carbon atoms: 36), 30.0 parts of isophthalic acid, 0.6 parts of adipic acid, 33.6 parts of 1,6-hexanediol, and 0.8 parts of trimethylolpropane were introduced, and while stirring the mixture the temperature was increased to 160° C. The temperature was kept at 160° C. for 1 hour and then increased to 230° C. over 5 hours. While keeping the temperature at 230° C., the acid value was regularly measured, and once the acid value of the resin reached 4 mgKOH/g, the temperature was decreased to 80° C. or below. At last, 60.8 parts of methyl ethyl ketone were added in order to obtain polyester polyol PP-1 having an acid value of 4 mgKOH/g, a hydroxyl group value of 62 mgKOH/g, and a weight average molecular weight of 7200.

Production Example 1-1(b): Production of Polyester Polyol PP-2

Into a flask equipped with a reflux condenser fitted with a separation tube for a reaction water, a thermometer, a stirrer, and a nitrogen gas introduction tube, 20.0 parts of dimer acid (trade name 'PRIPOL 1017', manufactured by Croda International plc, number of carbon atoms: 36), 35.0 parts of isophthalic acid, 8.6 parts of adipic acid, 35.6 parts of neopentyl glycol, and 0.8 parts of trimethylolpropane were introduced, and while stirring the mixture the temperature was increased to 160° C. The temperature was kept at 160° C. for 1 hour and then increased to 230° C. over 5 hours. While keeping the temperature at 230° C., the acid value was regularly measured, and once the acid value of the resin reached 4 mgKOH/g, the temperature was decreased to 80° C. or below. At last, 59.4 parts of methyl ethyl ketone were added in order to obtain polyester polyol PP-2 having an acid value of 4 mgKOH/g, a hydroxyl group value of 62 mgKOH/g, and a weight average molecular weight of 7200.

Production Example 1-1(c): Production of Water-Dispersible Polyurethane Resin PU-1 for First Aqueous Base Coat Into a flask equipped with a thermometer, a stirrer and a nitrogen gas introduction tube, 110.0 parts of the polyester polyol PP-1 obtained by Production Example 1-1(a), 4.5 parts of dimethylolpropionic acid, 2.0 parts of neopentyl glycol, and 18.0 parts of methyl ethyl ketone were introduced, and while stirring the mixture the temperature was increased to 80° C. At a temperature of 80° C., 12.0 parts of hexamethylene diisocyanate and 8.5 parts of isophorone diisocyanate were added, the temperature was maintained at 80° C., and once the isocyanate value reached 0.40 mmol/g (which is shown as 'isocyanate value (1)' in table 1), 3.0 parts of trimethylol propane were added, and the temperature was maintained at 80° C. Once the isocyanate value (which is shown as 'isocyanate value (2)' in table 1) reached 0.03 mmol/g, 5.1 parts of butyl cellosolve were added, the temperature was decreased to 50° C., and 3.3 parts of dimethylethanolamine were added for neutralization of an acid group, and 150.0 parts of deionized water were added. Thereafter, the temperature was increased to 100° C., methyl ethyl ketone was removed under a reduced pressure condition, and polyurethane resin PU-1 having the property values shown in Table 1 was obtained.

Production Examples 1-2 to 1-7: Production of Water-Dispersible Polyurethane Resins PU-2 to PU-7 for First Aqueous Base Coat Water-dispersible polyurethane resins PU-2 to PU-7 which have property values shown in table 1 were obtained in the same manner as in Production Example 1-1 in accordance with the blend compositions shown in table 1. However, for the Production Example 1-7 (polyurethane resin PU-7), the final isocyanate value was 0.005.

TABLE 1

Table 1: Water-dispersible polyurethane resins PU-1 to PU-7

| Water-dispersible polyurethane resin | PU-1 | PU-2 | PU-3 | PU-4 | PU-5 | PU-6 | PU-7 |
|---|---|---|---|---|---|---|---|
| Polyester polyol PP-1 | 110.0 | 110.0 | 110.0 | 110.0 | 110.0 | | 165.0 |
| Polyester polyol PP-2 | | | | | | 100.0 | |
| Dimethylolpropionic acid | 4.5 | 4.5 | 4.5 | 4.5 | 4.5 | 4.6 | 4.5 |
| Neopentyl glycol | 2.0 | 2.0 | 2.0 | 2.0 | 2.0 | 2.0 | 0.5 |
| Hexamethylene diisocyanate | 12.0 | 12.0 | 6.0 | 6.0 | | | 14.5 |
| Isophorone diisocyanate | 8.5 | 8.5 | 16.5 | 16.5 | 24.0 | 24.0 | 4.0 |
| Methyl ethyl ketone | 18.0 | 18.0 | 19.3 | 19.3 | 25.8 | 20.4 | 15.7 |
| Isocyanate value (1) (mmol/g) | 0.4 | 0.4 | 0.4 | 0.4 | 0.4 | 0.4 | 0.2 |
| Trimethylolpropane | 3.0 | 2.6 | 3.7 | 9.0 | 3.3 | 4.9 | 1.4 |
| Isocyanate value (2) (mmol/g) | 0.03 | 0.03 | 0.03 | 0.03 | 0.03 | 0.03 | 0.005 |
| Butyl cellosolve | 5.1 | 5.1 | 5.2 | 5.5 | 5.3 | 4.8 | 6.5 |
| Dimethylethanolamine | 3.3 | 3.3 | 3.3 | 3.4 | 3.3 | 3.3 | 2.4 |
| Deionized water | 150.0 | 150.0 | 150.0 | 150.0 | 150.0 | 150.0 | 150.0 |
| Weight average molecular weight | 71000 | 138000 | 32500 | 8000 | 55000 | 19000 | 488000 |
| Glass transition temperature (° C.) | −55 | −55 | −40 | −40 | −20 | 5 | −105 |
| Acid value (mgKOH/g) | 21 | 21 | 21 | 22 | 21 | 21 | 21 |
| Hydroxyl group value (mgKOH/g) | 40 | 34 | 45 | 108 | 42 | 64 | 64 |
| Resin solid content | 38% | 38% | 38% | 40% | 39% | 38% | 44% |

Production Example 2-1: Production of Water-Dispersible Polyester Resin PE

Into a flask equipped with a reflux condenser fitted with a separation tube for a reaction water, a thermometer, a stirrer, and a nitrogen gas introduction tube, 15.0 parts of dimer acid (trade name 'PRIPOL 1017', manufactured by Croda International plc, number of carbon atoms: 36), 30.0 parts of phthalic anhydride, 3.1 parts of adipic acid, 31.5 parts of 1,6-hexanediol, and 10.3 parts of trimethylolpropane were introduced, the temperature was increased to 120° C. and the starting materials were dissolved, thereafter, while stirring the mixture the temperature was increased to 160° C. The temperature was kept at 160° C. for 1 hour and then increased to 230° C. over 5 hours. After keeping the temperature at 230° C. for 2 hours, the temperature was decreased to 180° C. 10 parts of trimellitic anhydride were added, the acid value was regularly measured while maintaining the temperature to 180° C., and once the acid value reached 25 mgKOH/g, the temperature was decreased to 80° C. or below. 25 parts of butyl cellosolve were added, thereafter, 3.2 parts of dimethylethanolamine were added for neutralization of an acid group, and 34.1 parts of deionized water were added in order to obtain a water-dispersible polyester resin PE. For the property values of the water-dispersible polyester resin PE, the weight average molecular weight was 15000, the glass transition temperature was −30° C., the acid value was 25 mgKOH/g, the hydroxyl group value was 90 mgKOH/g, and the resin solid content was 60%.

Production Example 3-1: Production of Water-Dispersible Polyurethane Resin PU-8 for Second Aqueous Base Coat Production Example 3-1(a): Production of Polyester Polyol Into a flask equipped with a reflux condenser fitted with a separation tube for a reaction water, a thermometer, a stirrer, and a nitrogen gas introduction tube, 54.0 parts of dimer acid (trade name 'PRIPOL 1017', manufactured by Croda International plc, number of carbon atoms: 36), 8.0 parts of neopentyl glycol, 17.8 parts of isophthalic acid, 19.4 parts of 1,6-hexanediol, and 0.8 parts of trimethylolpropane were introduced, and while stirring the mixture the temperature was increased to 160° C. The temperature was kept at 160° C. for 1 hour and then increased to 230° C. over 5 hours. While keeping the temperature at 230° C., the acid value was regularly measured, and once the acid value of the resin reached 4 mgKOH/g, the temperature was decreased to 80° C. or below. At last, 31.6 parts of methyl ethyl ketone were added in order to obtain polyester polyol having an acid value of 4 mgKOH/g, a hydroxyl group value of 62 mgKOH/g, and a weight average molecular weight of 7200.

Production Example 3-1(b): Production of Water-Dispersible Polyurethane Resin PU-8

Into a flask equipped with a thermometer, a stirrer, and a nitrogen gas introduction tube, 81.5 parts of the polyester polyol obtained by Production Example 3-1(a), 6.1 parts of dimethylolpropionic acid, 1.4 parts of neopentyl glycol, and 30 parts of methyl ethyl ketone were introduced, and while stirring the mixture the temperature was increased to 80° C. At a temperature of 80° C., 25.9 parts of isophorone diisocyanate were added, the temperature was continuously maintained at 80° C., and once the isocyanate value reached 0.51 mmol/g, 5.8 parts of trimethylol propane were added, and the temperature was maintained at 80° C. Once the isocyanate value reached 0.01 mmol/g, 33.3 parts of butyl cellosolve were added, the temperature was increased to 100° C., and methyl ethyl ketone was removed under a reduced pressure condition. Finally, while lowering the temperature to 50° C., 3.6 parts of dimethylethanolamine were added for neutralization of an acid group, and 196.0 parts of deionized water were added in order to obtain polyurethane resin PU-8 having the property values shown in Table 2.

Production Example 4-1: Production of Water-Dispersible Acrylic Resin AC-1

Into a flask equipped with a reflux condenser, a thermometer, a stirrer, a nitrogen gas introduction tube and a dropping funnel, 40 parts of deionized water were introduced, and the temperature was increased to 80° C. under a nitrogen atmosphere. Next, as instillation components, a radical polymerizable monomer mixture comprising 15 parts of methyl methacrylate, 10 parts of styrene, 37 parts of n-butyl-methacrylate, 18.5 parts of 2-hydroxyethylmethacrylate, 9.2 parts of butyl acrylate and 10.3 parts of acrylic acid, an emulsifying agent solution comprising 4.0 parts of an emulsion polymerization adjuster (trade name 'THIOKALCOL 20' manufactured by Kao Corporation, n-dodecylmercaptane), 2.0 parts of a reactive anion emulsifying agent (trade name 'ELEMINOL RS-30' manufactured by Sanyo Chemical Industries, Ltd., methacryloyloxy polyoxyalkylene sodium sulfate), 1.0 part of a reactive nonionic emulsifying agent (trade name 'ADEKA REASOAP NE20', manufactured by ADEKA Corporation) and 15 parts of deionized water, and a polymerization initiator solution comprising 0.32 parts of ammonium persulfate and 15 parts of deionized water were added dropwise over 3 hours by means of a dropping funnel. After the dropwise addition, the mixture was stirred for 1 hour and then cooled down to 40° C. in order to obtain water-dispersible acrylic resin AC-1 having the property values shown in table 2.

Example 1

The first aqueous base coat and the second aqueous base coat were produced according to the methods shown below, multilayer coating films were formed by using these coatings, and the properties thereof were evaluated.

<Production of First Aqueous Base Coat>

Some of the aqueous polyurethane resin PU-1 were used as a dispersion resin, and 1 part of carbon black (trade name 'MA-100' manufactured by Mitsubishi Chemical Corporation) and 99 parts of titanium dioxide (trade name 'Ti-Pure R760', manufactured by DuPont) were dispersed by means of a motor mill in order to prepare a pigment paste. Next, the remaining water-dispersible polyurethane resin PU-1 was mixed by means of a dissolver, and the pigment paste was added thereto and mixed therewith. Finally, 28.0 parts of melamine resin MF-1 (trade name 'CYMEL 203', manufactured by Allnex group), 12.5 parts of MF-2 (trade name 'CYMEL 325', manufactured by Allnex group) and 66.5 parts of a water-dispersible polyester resin were added and mixed in order to obtain a first aqueous base coat. Herein, the content of the aqueous polyurethane resin PU-1 in the first aqueous base coat was 77.0 parts.

<Production of Second Aqueous Base Coat>

Some of the aqueous polyurethane resin PU-8 were used as a dispersion resin, and 5 parts of carbon black (trade name 'FW-200' manufactured by ORION ENGINEERED CARBONS) were dispersed by means of a motor mill in order to prepare a pigment paste. Next, 39.5 parts of the water-dispersible acrylic resin AC-1 and the remaining water-dispersible polyurethane resin PU-8 were mixed by means of a dissolver, and the pigment paste was added thereto and mixed therewith. Finally, 41.5 parts of melamine resin MF-1 (trade name 'CYMEL 203', manufactured by Allnex group) were added and mixed in order to obtain a second aqueous base coat. Herein, the content of the aqueous polyurethane resin PU-8 in the second aqueous base coat was 175.0 parts.

<Evaluation of Physical Properties of Coating Film>

The produced first aqueous base coat was applied to a polypropylene-made plate by means of air spray in the manner such that the dry film thickness was 15 μm, heating was applied at 140° C. for 30 minutes and then peeling off from the test plate was performed in order to prepare a test piece.

(1) Breaking Strength

A test piece of the first base monolayer coated film which was cut into a size of 10×70 mm was subjected to a measurement by means of 'Tensilon UTM III type' (trade name, manufactured by A&D Company, Limited.), at a temperature of 20° C. and a pulling rate of 4 mm/min and with a measurement length of 40 mm, and the load applied at the time of breaking was recorded.

(2) Loss Tangent (Tan δ) of Coating Film at −20° C.

The test piece of the first base monolayer coated film which was cut into a size of 5×20 mm was subjected to a measurement by means of an automatic viscoelastometer (manufactured by A&D Company, Limited.) at a temperature increase rate of 2° C./minute and with a measurement frequency of 11 Hz, and the loss tangent was determined at −20° C. from a phase difference generated between the vibration strain and the stress generated at the time of elevating a temperature, which was then recorded.

<Evaluation of Performance of Coating Film>

An electrodeposition coating of a cationic electrodeposition coating (trade name 'Cathoguard No. 800', manufactured by BASF Coatings GmbH) was performed on a zinc phosphate-treated mild steel sheet in the manner such that the dry film thickness was 20 μm, the resulting product was baked at 175° C. for 25 minutes in order to prepare an electrodeposition coating film sheet (hereinafter, 'electrodeposition sheet') for use in the present evaluation.

The produced first aqueous base coat and the second aqueous base coat were diluted with deionized water, and the viscosity was set to 40 seconds (Ford Cup No. 4, 20° C.). In addition, a rotary bell spray coater (trade name 'EG Bell 9', manufactured by Honda Engineering Co., Ltd.) was prepared, the coating conditions were set to 25° C. and 75% (relative humidity), and a multilayer coating film was formed by the following method.

The first aqueous base coat was applied to an electrodeposition sheet in the manner such that the dry film thickness was 20 μm. Thereafter, the coated film was left still at room temperature for 5 minutes, and the second aqueous base coat was applied in the manner such that the dry film thickness was 10 μm. After the application, the coated film was left still at room temperature for 5 minutes, and preheating was carried out at 80° C. for 3 minutes. The resulting film was left to cool to a room temperature, and then a clear coat (trade name 'Belcoat No. 6100' manufactured by BASF Japan Ltd.) was applied in the manner such that the dry film thickness was 30 μm. After the application, the resulting film was left still at room temperature for 10 minutes and baked at 140° C. for 30 minutes in order to obtain a test piece.

(1) Appearance of Coating Film

The smoothness of the surface of the coating film was measured by means of 'Wavescan DOI' (trade name, manufactured by BYK-GARDNER), and from the resulting Sw value, the appearance of the coating film of the test piece was evaluated on the following scale:

○: Sw value is less than 20

Δ: Sw value is 20 or greater and less than 25

×: Sw value is 25 or greater (2) Chipping Resistance 50 g of No. 7 crushed stone were used to attack the test piece at an angle of 90 degree by using 'Gravel Test Instrument JA400LA' (trade name, manufactured by Suga Test Instruments Co., Ltd.) at −20° C. from a distance of 55 cm with a compressed air of 0.2 MPa (2.0 kgf/cm$^2$). Thereafter, the resulting test piece was washed with water and dried, a fabric adhesive tape (manufactured by Nichiban Co., Ltd.) was adhered to the coating side and peeled off, thereafter, degree of damage formed on the coating film was visually investigated, and evaluation was made according to the following scale:

⊚: size of the damage was very small, and the electrodeposition face and the steel sheet serving as a basis material were not exposed ○: size of the damage was small, and the electrodeposition face and the steel sheet serving as a basis material were not exposed Δ: there was a lot of damage but the size was small, and the electrodeposition face or the steel sheet serving as a basis material was exposed ×: there was a lot of damage and the size was large, and the steel sheet serving as a basis material was also largely exposed (3) Hardness of Coating Film According to JIS K5600-5-4, a verified pencil was held on the coating face at 45° and pressed forward with a maximum power but at a degree of not breaking the lead. This was repeated five times at different places in the manner such that each length was around 10 mm. Thereafter, the pencil graphite was removed using a soft cloth or the like and the condition of the coating film was examined. A pencil hardness which gave no breaks for 4 or more instances from among 5 trials was used for evaluation according to the following scale:

⊚: H or higher

○: F

Δ: HB

×: B or lower (4) Migration Amount of Melamine Resin from Second Aqueous Base Coat-Coated Film Layer to First Aqueous Base Coat-Coated Film Layer The first aqueous base coat was applied to an electrodeposition sheet in the manner such that the dry film thickness was 15 μm. Thereafter, the coated film was left still at room temperature for 5 minutes, and the second aqueous base coat was applied in the manner such that the dry film thickness was 12 μm. After the application, the coated film was left still at room temperature for 5 minutes, and preheating was carried out at 80° C. for 3 minutes. Thereafter, the resulting film was baked at 140° C. for 30 minutes in order to obtain a test piece.

The center part of the obtained test piece was polished using a sandpaper P800 in order to expose the first aqueous base coat/second base coat interface. The exposed part was measured by means of Fourier transform infrared spectrometer (manufactured by Thermo Fisher Scientific Inc.) by an ATR technique (material: Si), the ratio $P^1/P^o$ of a 1560 cm$^{-1}$ peak strength $P^1$ derived from a triazine ring, which was based on a 1735 cm$^{-1}$ peak strength $P^o$ derived from a carbonyl group, was determined, and the migration amount of a melamine resin was obtained from a preliminarily prepared calibration curve.

Examples 2 to 14, Comparative Examples 1 to 6

Test pieces were prepared in the same manner as in Example 1 by using the first aqueous base coats and the second aqueous base coats shown in tables 2 and 3, and the performance of coating films were evaluated. The evaluation results are shown in tables 2 and 3.

<Discussion>

Examples 1 to 14 in overall gave better results than Comparative Examples 1 to 6. With reference to Examples 1, 9, 10 and 12, it was found that the weight average molecular weight of the component (A1) is preferably in the range of 60000 to 140000. In addition, with reference to Examples 1 and 11, it was found that the glass transition temperature of the component (A1) is preferably below −50° C.

For Comparative Examples 1 and 2, the molecular weight of the component (A1) was too small, and thus the appearance of the coating film was not great.

For Comparative Examples 1 and 6, the migration amount of a melamine resin from the second aqueous base coat-coated film layer to the first aqueous base coat-coated film layer was greater than 3 parts by mass with respect to 100 parts by mass of the total resin solid content of the first base coat, and thus the chipping resistance was not great.

For Comparative Example 2, the glass transition temperature of the component (A1) was too high, and thus the chipping resistance was not great.

For Comparative Example 3, the molecular weight of the component (A2) was small and the breaking strength of the monolayer coated film of the first aqueous base coat was too small, and thus the chipping resistance was not great.

For Comparative Examples 4 and 5, the loss tangent at −20° C. of the monolayer coated film of the first aqueous base coat was too low, and thus the chipping resistance was not great.

TABLE 2

| | | | Mw | Tg (° C.) | Resin solid content | Examples | | | | | | |
|---|---|---|---|---|---|---|---|---|---|---|---|---|
| | | | | | | 1 | 2 | 3 | 4 | 5 | 6 | 7 |
| First aqueous base coat | (A1) | PU-1 | 71000 | −55 | 38% | 77.0 | 51.0 | 102.5 | 90.0 | 64.0 | 77.0 | 77.0 |
| | | PU-2 | 138000 | −55 | 38% | | | | | | | |
| | | PU-3 | 32500 | −40 | 38% | | | | | | | |
| | | PU-5 | 55000 | −20 | 39% | | | | | | | |
| | | PU-7 | 488000 | −105 | 44% | | | | | | | |
| | (A2) | MF-1 | 1000 | | 72% | 28.0 | 28.0 | 28.0 | 21.0 | 35.0 | 35.0 | 28.0 |
| | | MF-2 | 600 | | 80% | 12.5 | 12.5 | 12.5 | 12.5 | 12.5 | 12.5 | 12.5 |
| | PE | | | | 60% | 66.5 | 83.5 | 50.0 | 66.5 | 66.5 | 58.5 | 66.5 |
| | Carbon black | | | | | 1.0 | 1.0 | 1.0 | 1.0 | 1.0 | 1.0 | 1.0 |
| | Titanium dioxide | | | | | 99.0 | 99.0 | 99.0 | 99.0 | 99.0 | 99.0 | 99.0 |
| | Total | | | | | 284.0 | 275.0 | 293.0 | 290.0 | 278.0 | 283.0 | 284.0 |

TABLE 2-continued

| | | | | | | | | | | | | |
|---|---|---|---|---|---|---|---|---|---|---|---|---|
| | Solid content mass ratio of (pigment)/(resin) | | | | 1.0 | 1.0 | 1.0 | 1.0 | 1.0 | 1.0 | 1.0 |
| | Monofilm property value | Breaking strength | | | 2140 | 2280 | 2100 | 2070 | 2310 | 2240 | 2140 |
| | | Loss tangent at −20 °C. | | | 0.081 | 0.077 | 0.083 | 0.082 | 0.079 | 0.076 | 0.081 |
| Second aqueous base coat | AC-1 | 20000 | 41 | 45% | 39.5 | 39.5 | 39.5 | 39.5 | 39.5 | 39.5 | 50.5 |
| | PU-8 | 24500 | −35 | 30% | 175.0 | 175.0 | 175.0 | 175.0 | 175.0 | 175.0 | 191.5 |
| | MF-1 | 1000 | | 72% | 41.5 | 41.5 | 41.5 | 41.5 | 41.5 | 41.5 | 27.5 |
| | Carbon black | | | | 5.0 | 5.0 | 5.0 | 5.0 | 5.0 | 5.0 | 5.0 |
| | Total | | | | 261.0 | 261.0 | 261.0 | 261.0 | 261.0 | 261.0 | 274.5 |
| | Solid content mass ratio of (pigment)/(resin) | | | | 0.05 | 0.05 | 0.05 | 0.05 | 0.05 | 0.05 | 0.05 |
| Evaluation | Coating film appearance | | | | ○ | ○ | ○ | ○ | ○ | ○ | ○ |
| | Chipping resistance | | | | ○ | Δ | ◎ | ◎ | Δ | Δ | ○ |
| | Coating film hardness | | | | ◎ | ◎ | Δ | Δ | ◎ | ◎ | ○ |
| Migration amount of melamine resin to first aqueous base coat-coated film layer (amount in parts by mass of melamine resin, with respect to 100 parts by mass of total resin solid content of first aqueous base coat) | | | | | 0.9 | 2.4 | 0.3 | 0.6 | 1.7 | 0.9 | 0.7 |

| | | | Mw | Tg (°C.) | Resin solid content | Example 8 | 9 | 10 | 11 | 12 | 13 | 14 |
|---|---|---|---|---|---|---|---|---|---|---|---|---|
| First aqueous base coat | (A1) | PU-1 | 71000 | −55 | 38% | 77.0 | | | | | 77.0 | 77.0 |
| | | PU-2 | 138000 | −55 | 38% | | 77.0 | | | | | |
| | | PU-3 | 32500 | −40 | 38% | | | 77.0 | | | | |
| | | PU-5 | 55000 | −20 | 39% | | | | 75.0 | | | |
| | | PU-7 | 488000 | −105 | 44% | | | | | 68.5 | | |
| | (A2) | MF-1 | 1000 | | 72% | 28.0 | 28.0 | 28.0 | 28.0 | 28.0 | 41.5 | 0.0 |
| | | MF-2 | 600 | | 80% | 12.5 | 12.5 | 12.5 | 12.5 | 12.5 | 0.0 | 37.5 |
| | PE | | | | 60% | 66.5 | 66.5 | 66.5 | 66.5 | 66.5 | 66.5 | 66.5 |
| | Carbon black | | | | | 1.0 | 1.0 | 1.0 | 1.0 | 1.0 | 1.0 | 1.0 |
| | Titanium dioxide | | | | | 99.0 | 99.0 | 99.0 | 99.0 | 99.0 | 99.0 | 99.0 |
| | Total | | | | | 284.0 | 284.0 | 284.0 | 282.0 | 275.5 | 285.0 | 281.0 |
| | Solid content mass ratio of (pigment)/(resin) | | | | | 1.0 | 1.0 | 1.0 | 1.0 | 1.0 | 1.0 | 1.0 |
| | Monofilm property value | Breaking strength | | | | 2140 | 2100 | 2090 | 2110 | 2055 | 2180 | 2120 |
| | | Loss tangent at −20 °C. | | | | 0.081 | 0.082 | 0.080 | 0.075 | 0.085 | 0.080 | 0.082 |
| Second aqueous base coat | AC-1 | 20000 | 41 | 45% | | 28.0 | 39.5 | 39.5 | 39.5 | 39.5 | 39.5 | 39.5 |
| | PU-8 | 24500 | −35 | 30% | | 158.5 | 175.0 | 175.0 | 175.0 | 175.0 | 175.0 | 175.0 |
| | MF-1 | 1000 | | 72% | | 55.5 | 41.5 | 41.5 | 41.5 | 41.5 | 41.5 | 41.5 |
| | Carbon black | | | | | 5.0 | 5.0 | 5.0 | 5.0 | 5.0 | 5.0 | 5.0 |
| | Total | | | | | 247.0 | 261.0 | 261.0 | 261.0 | 261.0 | 261.0 | 261.0 |
| | Solid content mass ratio of (pigment)/(resin) | | | | | 0.05 | 0.05 | 0.05 | 0.05 | 0.05 | 0.05 | 0.05 |
| Evaluation | Coating film appearance | | | | | ○ | ○ | Δ | ○ | Δ | ○ | ○ |
| | Chipping resistance | | | | | Δ | ○ | Δ | Δ | ○ | ○ | Δ |
| | Coating film hardness | | | | | ◎ | ◎ | ◎ | ◎ | Δ | ◎ | ◎ |
| Migration amount of melamine resin to first aqueous base coat-coated film layer (amount in parts by mass of melamine resin, with respect to 100 parts by mass of total resin solid content of first aqueous base coat) | | | | | | 1.8 | 0.8 | 2.4 | 1.5 | 0.1 | 0.8 | 0.8 |

TABLE 3

| | | | Mw | Tg (°C.) | Resin solid content | Comparative Examples 1 | 2 | 3 | 4 | 5 | 6 |
|---|---|---|---|---|---|---|---|---|---|---|---|
| First aqueous base coat | (A1) | PU-1 | 71000 | −55 | 38% | | | 77.0 | 77.0 | 38.5 | |
| | | PU-3 | 32500 | −40 | 38% | | | | | | 51.0 |
| | | PU-4 | 8000 | −40 | 40% | 75.0 | | | | | |
| | | PU-6 | 19000 | 5 | 38% | | 75.0 | | | | |
| | (A2) | MF-1 | 1000 | | 72% | 28.0 | 28.0 | | 55.5 | 28.0 | 28.0 |
| | | MF-2 | 600 | | 80% | 12.5 | 12.5 | | | 12.5 | 12.5 |
| | | MF-3 | 500 | | 75% | | 40.0 | | | | |

TABLE 3-continued

|  |  | Mw | Tg (° C.) | Resin solid content | Comparative Examples | | | | | |
|---|---|---|---|---|---|---|---|---|---|---|
|  |  |  |  |  | 1 | 2 | 3 | 4 | 5 | 6 |
|  | PE |  |  | 60% | 66.5 | 66.5 | 66.5 | 50.0 | 91.5 | 83.5 |
|  | Carbon black |  |  |  | 1.0 | 1.0 | 1.0 | 1.0 | 1.0 | 1.0 |
|  | Titanium dioxide |  |  |  | 99.0 | 99.0 | 99.0 | 99.0 | 99.0 | 99.0 |
|  | Total |  |  |  | 282.0 | 282.0 | 283.5 | 282.5 | 270.5 | 275.0 |
|  | Solid content mass ratio of (pigment)/(resin) |  |  |  | 1.0 | 1.0 | 1.0 | 1.0 | 1.0 | 1.0 |
|  | Monofilm Breaking strength |  |  |  | 2100 | 2120 | 2020 | 2320 | 2340 | 2050 |
|  | property value Loss tangent at −20° C. |  |  |  | 0.82 | 0.076 | 0.083 | 0.074 | 0.072 | 0.077 |
| Second | AC-1 | 20000 | 41 | 45% | 39.5 | 39.5 | 39.5 | 39.5 | 39.5 | 39.5 |
| aqueous | PU-8 | 24500 | −35 | 30% | 175.0 | 175.0 | 175.0 | 175.0 | 175.0 | 175.0 |
| base coat | MF-1 | 1000 |  | 72% | 41.5 | 41.5 | 41.5 | 41.5 | 41.5 | 41.5 |
|  | Carbon black |  |  |  | 5.0 | 5.0 | 5.0 | 5.0 | 5.0 | 5.0 |
|  | Total |  |  |  | 261.0 | 261.0 | 261.0 | 261.0 | 261.0 | 261.0 |
|  | Solid content mass ratio of (pigment)/(resin) |  |  |  | 0.05 | 0.05 | 0.05 | 0.05 | 0.05 | 0.05 |
| Evaluation | Coating film appearance |  |  |  | × | × | ○ | Δ | ○ | Δ |
|  | Chipping resistance |  |  |  | × | × | × | × | × | × |
|  | Coating film hardness |  |  |  | ⊚ | ⊚ | ⊚ | ⊚ | ⊚ | ○ |
| Migration amount of melamine resin to first aqueous base coat-coated film layer (amount in parts by mass of melamine resin, with respect to 100 parts by mass of total resin solid content of first aqueous base coat) |  |  |  |  | 3.2 | 2.6 | 0.7 | 0.8 | 2.8 | 3.4 |

The invention claimed is:

1. A method for forming a multilayer coating film, comprising:
    applying a first aqueous base coat, a second aqueous base coat and a clear coat to an object to be coated in succession and simultaneously heating and curing the three-layer coating film, wherein the first aqueous base coat comprises:
        a water-soluble or water-dispersible polyurethane resin having a glass transition temperature of −20° C. or below and a weight average molecular weight of 30,000 to 500,000; and
    a crosslinkable resin having a weight average molecular weight of 600 or more,
    wherein the first aqueous base coat-coated film has a breaking strength of 2050 N/cm2 or more and a loss tangent (tan δ) at −20° C. of 0.075 or more, and a migration amount of a melamine resin from the second aqueous base coat-coated film layer to the first aqueous base coat-coated film layer is within 3 parts by mass with respect to 100 parts by mass of a total resin solid content of the first aqueous base coat.

2. The method for forming a multilayer coating film as claimed in claim 1, wherein the first aqueous base coat includes 20 to 40 parts by mass of the water-soluble or water-dispersible polyurethane resin with respect to 100 parts by mass of the total resin solid content.

3. The method for forming a multilayer coating film as claimed in claim 1, wherein the crosslinkable resin of the first aqueous base coat is a melamine resin and/or blocked polyisocyanate resin and the crosslinkable resin is included in an amount of 25 to 35 parts by mass with respect to 100 parts by mass of the total resin solid content.

4. The method for forming a multilayer coating film as claimed in claim 1, wherein the second aqueous base coat includes a crosslinkable resin in an amount of 10 to 40 parts by mass with respect to 100 parts by mass of the total resin solid content.

* * * * *